US006939383B2

(12) United States Patent
Eastin et al.

(10) Patent No.: US 6,939,383 B2
(45) Date of Patent: Sep. 6, 2005

(54) METHOD FOR MAKING ELECTRODE

(75) Inventors: Brian C. Eastin, Woodbury, MN (US); Katherine A. Graham, Roseville, MN (US); Tony B. Hollobaugh, Jacksonville, FL (US); James A. McDonell, Woodbury, MN (US); Jeffrey J. Missling, Mound, MN (US); John R. Wheeler, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 503 days.

(21) Appl. No.: 10/138,278

(22) Filed: May 3, 2002

(65) Prior Publication Data

US 2003/0205835 A1 Nov. 6, 2003

(51) Int. Cl.[7] ............................................... H01M 6/00
(52) U.S. Cl. .................. 29/623.1; 29/623.5; 429/218.1; 429/231.5; 429/231.95; 429/223; 429/224; 264/211.11; 264/211.21; 264/211.23
(58) Field of Search ............................. 29/623.5, 623.1; 429/300, 218.1, 127, 162, 231.5, 224, 223, 231.95; 264/211.11, 211.21, 211.23

(56) References Cited

U.S. PATENT DOCUMENTS

| 4,976,904 | A | | 12/1990 | Bilhorn |
| 5,044,757 | A | | 9/1991 | Dienst |
| 5,593,462 | A | | 1/1997 | Gueguen et al. |
| 5,698,147 | A | | 12/1997 | Chern et al. |
| 5,725,822 | A | * | 3/1998 | Keller et al. ............ 264/211.11 |
| 5,749,927 | A | | 5/1998 | Chern et al. |
| 5,804,116 | A | | 9/1998 | Schmid et al. |
| 6,284,192 | B1 | | 9/2001 | Coonan et al. |
| 6,533,955 | B1 | * | 3/2003 | Molnar et al. ................. 252/54 |
| 6,589,299 | B2 | * | 7/2003 | Missling et al. ............ 29/623.5 |

FOREIGN PATENT DOCUMENTS

| WO | WO 98/44576 | 10/1998 |
| WO | WO 00/51806 | 9/2000 |
| WO | WO 02/065563 | 8/2002 |

* cited by examiner

Primary Examiner—Bruce F. Bell

(57) ABSTRACT

Described are methods of making electrodes for electrochemical systems, especially cathodes for lithium polymer batteries, and products prepared from the methods; the methods involve the use of a co-rotating, fully intermeshing twin screw extruder, the extrusion of essentially solvent-free systems, or both.

48 Claims, 4 Drawing Sheets

METHOD FOR MAKING ELECTRODE

FIELD OF THE INVENTION

The invention relates to methods of making electrodes for electrochemical systems, especially cathodes for lithium polymer batteries, and products prepared from the methods.

BACKGROUND

Modern electrochemical systems such as fuel cells, capacitors, sensors, and batteries can be constructed of electrochemical components that include a set of electrodes. In batteries, electrodes are typically made up of materials including an active material (i.e., an electrochemically-active material capable of undergoing reduction-oxidation), e.g., an oxide such as vanadium oxide, disposed in a polymeric matrix which may include an ionically-conductive polymer. The greater the amount of active material included in the electrode, the greater the capacity of the battery. Battery electrodes may further contain other useful materials including an electrically-conductive material (sometimes referred to as an "electrically-conductive diluent") such as carbon, and an electrolyte salt such as lithium bis(trifluoromethanesulfonyl)imide, among various others.

Electrodes are often produced using standard coating techniques by dissolving or dispersing the active component, the electrically-conductive material, the electrolyte salt, and the polymer in a solvent and coating the solution onto a substrate. The materials are generally milled prior to being dispersed into the solvent and coated.

Some attempts have been made to prepare electrochemical components by extrusion methods. Such methods may include conditions of high shear and high temperature, making them prone to degrade materials of the electrochemical components, especially the polymer. See, e.g., U.S. Pat. Nos. 4,976,904, 5,804,116 and 5,749,927. Some of these have used solvents, plasticizers, liquids, or softening agents to avoid these conditions.

There is an ongoing need for new and improved methods of preparing electrochemical components such as electrodes, e.g., cathodes. Particularly desirable methods would allow the production of electrochemical components without degrading the components, most preferably could be accomplished with minimal or no use of solvents, and would produce an electrochemical component having useful properties, including, preferably, a high loading of active material.

SUMMARY

The invention relates to methods for producing components of electrochemical systems such as electrodes, using a multi-screw extruder. Specifically, it has been found that electrode components can be processed, e.g., combined, melted, and/or extruded, using a multi-screw extruder to form electrodes useful in electrochemical systems such as batteries. According to the invention, a multi-screw extruder is used to combine electrode components into an electrode, with excellent distributive mixing, with very useful properties, and preferably without the use of additional solvents. The temperature and shear conditions of the multi-screw extruder can be sufficiently vigorous to provide a useful and well-mixed, uniform mixture while still being sufficiently mild to avoid significant degradation of the electrode components, such as the polymer. In this regard, when the active material is in powder form, the process should be mild enough so as not to reduce the particle size of the active material, as this may lead to inactivation of the active material. Advantageously, as will be appreciated to the skilled artisan, the method can be used in a continuous process of producing electrodes, e.g., by mixing continuous streams of feed materials in a constant, continuous fashion to produce a continuous stream of extrudate.

Extrusion is a desirable alternative to conventional methods of preparing electrochemical components, such as methods involving solvent coating. Multi-screw extruders are known machinery for extruding plastic materials, and commonly take the form of twin screw extruders. A twin screw extruder includes a pair of screw components each extending along one of a pair of parallel, co-joined channels of the extruder barrel. In a co-rotating twin screw extruder, the screw components rotate in the same direction. The degree of intermeshing for a twin screw extruder can vary from fully intermeshing to non-intermeshing. A common form of twin screw extruder is a co-rotating, fully intermeshing twin screw extruder.

In the past, extrusion methods for preparing electrochemical systems have been used with solvents, i.e., "softening solvents." Examples of solvents or "softening solvents" that have been used are ethylene carbonate, propylene carbonate, dimethyl carbonate, dietheyl carbonate, dimethyl adipate, tetramethylene sulfone, gamma-butyrolactone, dimetllylformamide, dioctyl phthlate, tetrahydrofuran, polyethylene glycol dimethyl ether, and polyethylene glycol.

Materials used to produce electrodes, especially cathodes, may preferably include an active agent, an electrically-conductive material, "ionically-conductive" polymer, and an electrolyte salt. Other optional ingredients such as additional polymer or other additives may of course also be included. According to the invention, an electrode can be produced with solventless ("neat") forms of materials, and without the addition of a separate solvent ingredient. That is, the invention contemplates processing the electrode components through a multi-screw extruder without any added solvent, and preferably with essentially no solvent or absolutely no solvent at all. As used herein, "solvent" is given its generally accepted and understood meaning, and includes organic and inorganic liquids or plasticizers known to be used or useful to dissolve or soften other organic or inorganic materials, and specifically includes water. Reducing or eliminating solvent from a method of producing battery electrodes has obvious advantages, including environmental advantages in the production of less waste, and elimination of processing steps that are designed to remove the solvent after deposition of the electrode materials onto a substrate, with elimination of attendant costs, time, and labor. Furthermore, if the solvent is not essentially fully removed from the electrode it may also reduce mechanical integrity or stability of the electrode.

Electrodes can be produced according to the invention to exhibit excellent mixing of the active ingredient, electrically-conductive material, polymer, and salt, and can advantageously be prepared to have relatively high active material loadings of greater than about 50 weight percent, e.g., about 60 to 68, or up to 86 weight percent active material. Specifically, an embodiment of the invention involves a continuous, solventless process for compounding a well-mixed, highly filled polymeric material for an electrochemical electrode, e.g., a cathode. The process includes extruding the materials using a co-rotating, fully intermeshing twin screw extruder such as the type sold under the trademark Berstorff®. The feed arrangement of the different components into the extruder can be any arrangement that proves useful. However, in one preferred embodiment of the invention, the components are fed to the extruder according to the following arrangement: an electrolyte salt is fed at the extruder's feed throat; polymer is fed slightly downstream, and an electrically-conductive material and active material are fed further downstream. An extrudate of the processed components is removed from the far downstream end of the extruder, in a shape conducive to the end use application.

An aspect of the invention relates to a method for combining electrode components. The electrode components include an active material, an electrically-conductive material, an ionically-conductive polymer, an electrolyte salt, and no added solvent. The method includes processing the electrode components using a twin screw extruder. Preferably, the individual electrode components and their combined mixture will contain essentially no solvent.

Another aspect of the invention relates to a method for combining electrode components that include an active material, an electrically-conductive material, an ionically-conductive polymer, and an electrolyte salt. The method includes processing an electrode components using a twin screw extruder and processing ionically-conductive polymer salt complex in a molten state. This is in contrast, for example, to methods of using an extruder to process a solvent-containing mixture for coating.

Yet a further aspect of the invention relates to a method of producing a battery cathode. The method includes processing a mixture of ingredients that include greater than about 50 weight percent active material; from about 1 to about 10 weight percent electrically-conductive material comprising carbon black, graphite, or a combination thereof; from about 10 to about 40 weight percent polymer comprising ionically-conductive, e.g., polyalkylenoxide, polymer; and from about 3 to about 15 weight percent fluorinated lithium salt. Also according to this aspect of the invention, the mixture can include a total of less than about 0.5 percent by weight solvent. The method involves a twin screw extruder and an ionically-conductive polymer salt complex which is processed in a molten state.

DETAILED DESCRIPTION

Figure 1:
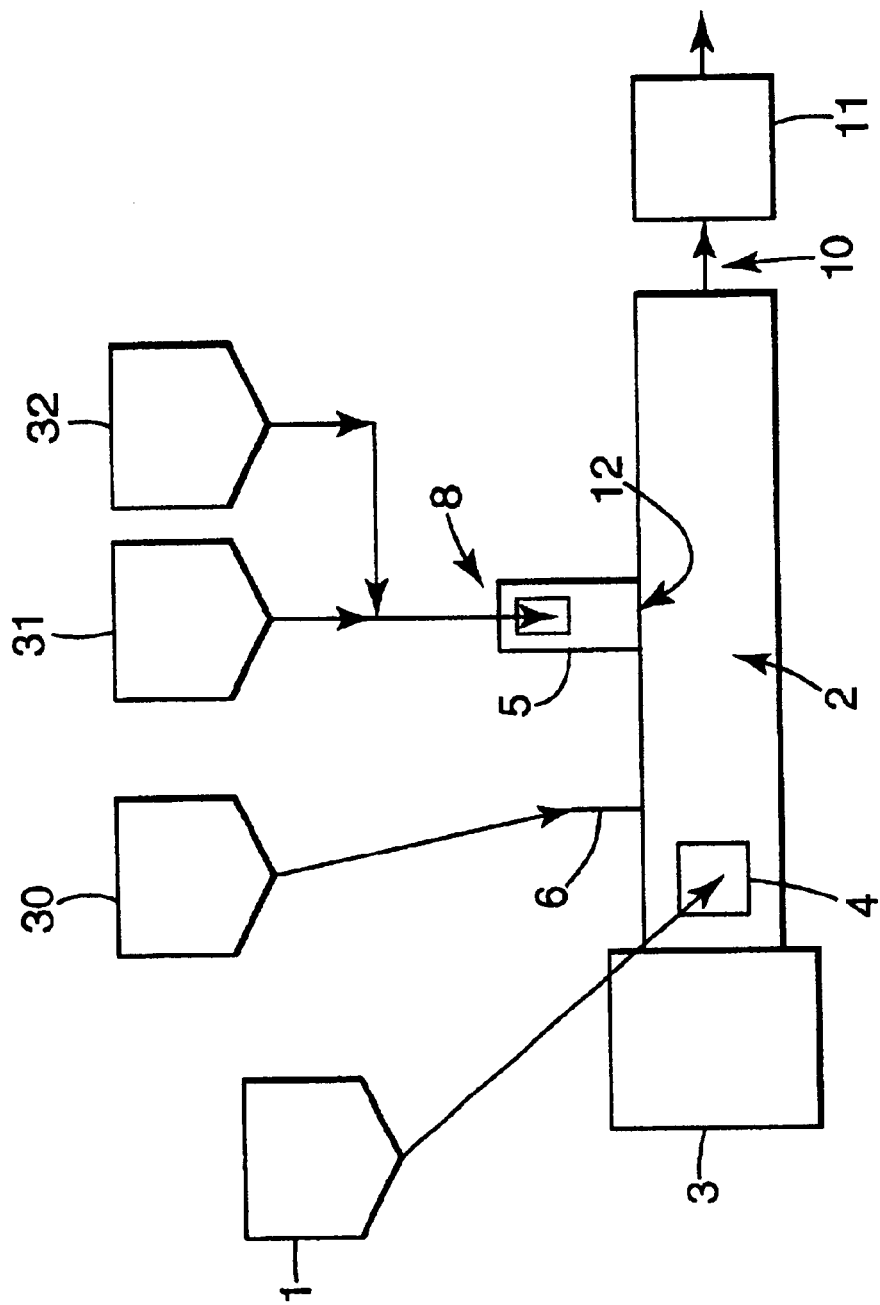
FIGS. 1, 2, and 3, each schematically illustrate top views of illustrative embodiments of a multi-screw extruder used to practice the invention.

According to the invention, an electrode of an electrochemical cell can be produced by processing with a multi-screw extruder, and more preferably, with a co-rotating, fully intermeshing twin screw extruder. The electrode may be any type of electrode, such as a cathode.

The materials processed to produce the electrode (referred to herein for convenience as the "electrode components") can be any materials that are generally known and useful for electrodes or other components of an electrochemical cell. In a preferred embodiment of the invention the electrode components include an active material, an electrically-conductive material, an ionically-conductive polymer, and an electrolyte salt. Most preferably, as described below, none of the electrode materials include solvent (i.e., each is essentially solvent-free), and no solvent is added for processing in the extruder.

The active material can be any of a variety of active materials known to be useful ionically-conductive in electrodes, including oxide materials. The exact material used can be chosen based on various factors. As one example, the active material for use in lithium polymer batteries should be capable of storing lithium ion.

Examples of suitable active materials include graphite, amorphous carbon, $Li_xCoO_2$, $Li_xNiO_2$, Co-doped $Li_xNiO_2$, $Li_xMn_2O_4$, $Li_xMnO_2$, $V_2O_5$, $V_6O_{13}$, $Li_xV_3O_8$, $Ba_2SmNiO_5$, $SmMnO_3$, $Sm_3Fe_5O_{12}$, $EuFeO_3$, $EuFe_5O_{12}$, $EuMnO_3$, $LaNiO_3$, $La_2CoO_4$ and $LaMnO_3$ (including the charged and discharged forms of these materials), and conducting polymers such as polypyrrole, polysulfides and polyvinylferrocene. In primary batteries, the cathode can be fluorinated carbon, $SO_2Cl_2$, $Ag_2V_4O_{11}$, $Ag_2CrO_4$, $V_2O_5$, $AgCl$, $MoO_3$, $FeS$, $CuS$, sulfur and polysulfide. Particularly preferred electrode active materials include vanadium oxide and lithiated vanadium oxide.

The amount of active material used can be any useful amount, as will be understood by one of ordinary skill. It is typically desired to include as high of a loading of active material as possible, because a relatively higher loading of active material compared to the other non-active materials such as polymer, salt, etc., will provide a battery with a higher capacity. The present invention allows the production of electrodes of a relatively high loading of active material, e.g., greater than about 50 percent by weight active material based on the total weight of all electrode components. Preferred amounts of vanadium oxide active material can be, for example, in the range up to about 86 percent by weight, based on the total weight of all electrode components, e.g., from about 55 to about 80 weight percent, or from about 60 to about 68 percent by weight.

Electrically-conductive material can be included in the electrode to aid in electrical conductivity of the electrode. Useful electrically-conductive materials are well known, and can include, for example, carbon, e.g., carbon black or graphite, lamp black, coke, carbon microbeads, carbon fibers, carbon flakes, copper powder, or other metal powders. The actual electrically-conductive material used in any particular electrode can be chosen based on various factors, such as the other materials of the electrode, or the electrochemical system. Often, carbon black or graphite are preferred. Useful amounts of the electrically-conductive material will be understood by the skilled artisan, for any particular electrode, and can be any amount that aids in electronic conductivity of the electrode. An example of a useful amount of electrically-conductive material can be in the range from about 1 to about 10 weight percent electrically-conductive material, based on the total weight of all electrode components.

An ionically-conductive polymer is included as an electrode component as a binder to hold the electrode components together in the form of a functioning mass that is ionically-conductive. The polymer can be chosen to provide desired adhesion and conductivity properties. The ionically-conductive polymer may be a single type of polymer, or may be a mixture of two or more ionically-conductive polymers. Or, the electrode may include a mixture of one or more ionically-conductive polymers with another polymer that is not ionically-conductive.

Ionically-conductive polymers for use in electrode materials are well known and commercially available. One exemplary class of ionically-conductive polymers is the class of polymers that are derivatives of monomers comprising an oxygen-containing monomer or a nitrogen-containing monomer. Preferred ionically-conductive polymers are capable of conducting ions at room temperature, and are capable of dissociating alkali metal salts.

Examples of suitable ionically-conductive polymers include polyethers of the general formula $$HO(CH_2CH_2O)_x(CH_2CHRO)_yH,$$

where x and y are mole fractions between 0 and 1, and x+y=1, and

R is:
 a straight chain or branched alkyl group having the formula $C_nH_{2n+1}$ where n is 1 to 12;
 a straight chain or branched arylalkyl group having the formula $ArC_{n'}H_{2n'}$ where n' is 1 to 12 and Ar is an aromatic moiety (e.g. phenyl and naphthyl);
 an ethylenically unsaturated group having the formula $CHR'=C(R')ZC_{n''}H_{2n''}$, where R' is H or methyl, Z, if present, is —O—, —S—, —SO—, —SO$_2$—, —NH—, —C(O)—, or —C(O)O—, and n" is 0 to 12; or,
 an oligoether of the general formula $R'(CHR'CH_2O)_n$, where R' and n are as defined above.

Other examples of useful ionically-conductive polymers include polysiloxanes, polyphosphazenes, polyacrylates.

One class of preferred ionically-conductive polymers include polyalkylenoxide homopolymers or copolymers derived from monomers such as ethylene oxide, propylene oxide, butylene oxide, and allyl glycidyl ether. Such polymers are commercially available under such designations as DAP and polyethyleneoxide available from Union Carbide under the designation Polyox. Examples of such ionically-conductive polymers and their preparation are also described, for example, in U.S. Pat. No. 4,303,708, the entirety of which is incorporated herein by reference.

Useful amounts of ionically-conductive polymer used in an electrode can be any amount that will act to bind the other ingredients into a useful electrode, as well as provide desired conductivity. Exemplary amounts may be, for example, in the range from about 10 to about 40 weight percent ionically-conductive polymer, based on the total amount of all electrode components, more preferably from about 26 to about 32 weight percent.

As mentioned, other polymers that are not ionically-conductive may also be used in the electrode. Such polymer may be included to improve mechanical integrity or as a low cost binder. Examples include polyvinylidenefluoride (PVDF), polyacrylonitrile (PAN) and polyvinylpyrrolidinone (PVP), ethylenepropylene-diene (EPDM) terpolymer and emulsified styrene-butadiene rubber, among others. If non-ionically-conductive polymer is included in an electrode, it can be used in any amount that is useful, e.g., to provide a desired property, such as mechanical integrity, and is preferably included in an amount in the range from about 0 to about 50 percent by weight of the total weight of polymer (the total amount of ionically-conductive and non-ionically-conductive polymer).

The electrolyte salt is a highly dissociated salt capable of being dissolved in the ionically-conductive polymer. For lithium polymer batteries, the salt is typically a lithium salt.

Electrolyte salts are well known in the arts relating to electrochemistry and electrochemical systems. Specific examples of preferred lithium salts are also well known and include lithium hexafluoroarsenate, lithium perchlorate, lithium hexafluorophosphate, lithium trifluoroborate, lithium trifluoromethanesulfonate, lithium bis(trifluoromethanesulfonyl)imide, lithium bis(perfluoroethanesulfonyl)imide, lithium tris(trifluoromethanesulfonyl)methide. See also Assignee's copending U.S. patent application Ser. No. 08/988,507 filed Dec. 10, 1997, and Ser. No. 09/139,315 filed Aug. 25, 1998, the disclosures of which are incorporated herein by reference. Particularly preferred are lithium hexafluorophosphate and lithium bis(trifluoromethanesulfonyl)imide.

The amount of electrolyte salt included in the electrode components should be enough to provide for a functioning electrode, e.g., to result in a sufficient level of ionic conductivity. Those of ordinary skill will appreciate amounts of the salt that will be useful in electrodes prepared by methods described herein. A useful amount for a particular electrode can depend on a variety of factors such as the particular salt chosen and the types and amounts of the other electrode components. While other amounts may be found to be useful, examples of useful amounts of electrolyte salt can be in the range from about 3 to about 15 weight percent based on the total weight of all electrode components, preferably from about 5 to about 10 weight percent.

Other optional ingredients may also be included in the electrode components, as will be understood by those of ordinary skill. These optional ingredients may include materials such as pore formers, surfactants, flow agents, and antioxidants.

According to the practice of the invention, no solvent needs to be included in or added to the electrode components in order to process the components into an electrode, as described herein. Specifically, other methods of producing electrodes include the use of a solvent, e.g., a "softening solvent," to provide a mixture of materials that has rheological properties such as viscosity that are easier to process into an electrode. Examples of these solvents may include ethylene carbonate, propylene carbonate, dimethyl carbonate, dietheyl carbonate, dimethyl adipate, tetramethylene sulfone, gamma-butyrolactone, dimethylformamide, dioctyl phthlate, tetrahydrofuran, polyethylene glycol dimethyl ether, and polyethylene glycol. According to the invention, electrode components can be combined together in their dry, solvent-free, or "neat" forms, and extruded without adding separate solvent, by using a multi-screw extruder. This means that no solvent needs to be contained in any of the individual electrode components—e.g., beyond what is present as residual solvent from earlier processing—and no additional solvent needs to be added to the individual or combined electrode components. Most preferably, each one of the individual electrode components can be essentially free of solvent, meaning that each component contains an amount of solvent that is insufficient to act as a processing aid, for example that each electrode component contains less than one half of one percent solvent (<0.5 wt. %) by weight. Furthermore, no solvent needs to be added to any single component or to the combined components for processing. Overall, the combined electrode materials can be processed in a neat, essentially solventless form that contains an amount of solvent that is insufficient to act as a processing aid, e.g., the total amount of solvent contained in the combined electrode components, if any, is less than one half of one percent by weight (<0.5 weight percent). Still more preferably, the combined electrode components during processing can contain less than about 0.1 weight percent solvent based on the total weight of all electrode components, and most preferably the combined electrode components contain no solvent at all.

According to one embodiment of the invention, the electrode components are processed using a co-rotating, fully intermeshing twin screw extruder. In general, such an extruder includes an extrusion device that includes two axially parallel screws that are rotated within parallel and joined channels and are able to process materials in the space between the screws themselves and the channel walls by kneading and mixing the materials, (which may be introduced into the channels via any location along the length of the channels). The screws are rotated in the same direction about their respective axes (i.e., co-rotating), and the flights on each screw overlap radially to the greatest extent possible (i.e., fully intermeshing). Co-rotating, fully intermeshing twin screw extruders are very common, and are commercially available in various sizes and configurations.

The construction and operating principles of such twin screw extruders are known. Twin screw extruders comprise a pair of screws rotatably mounted inside a temperature controlled pair of coextensive channels, and feed ports or openings along the channels for introducing one or a number of different feed components into the channels at various positions along the length of the channels. The channels can consist of one or several independently and precisely controlled temperature zones. Each screw includes a series of flights or flighted elements thereon to advance and mix the material along the length of the channel while producing a desired amount of shear. The flights are angled at a pitch which facilitates a pumping action during rotation of the screws. A wide variety of flighted elements are commercially available which mix, knead, or pump in various proportions. These various flighted elements can be arranged, as is known, in various combinations to facilitate a combination of mixing and advancing action.

At the end of the channels is a forming or extruding end, e.g., a die, chosen to produce an output stream of the mixed feed materials in a desired form, such as a film or layer.

In operation, heat is transferred to the feed components in the extruder from two sources: (1) heating fluid or resistive heaters enclosed in the walls of the extruder channels and the extruding end; and (2) from the shearing action generated between the screw flights and their respective channels during rotation of the screws in their channels. The total heat supplied from both sources can be controlled to melt one or more of the feed components, preferably without substantial degradation of any of the components.

The revolution rates of the screws can be adjusted to be equal or higher than the rate at which a given size extruder can extrude a desired mass flow rate of combined feed components.

Co-rotating, fully intermeshing twin screw extruders are typically sized based on channel cross-sectional area and typically range from 18 mm to 100 mm or larger. The length of each channel is typically expressed as a multiple of the diameter, and stated as a length to diameter (L/D) ratio. Co-rotating, fully, intermeshing twin screw extruders typically have a length ranging from 10 to over 70 L/D ratio.

The operating conditions, including the temperature at the different locations of the extruder, the amount of shear exerted on the feed components (controlled, e.g., by the speed of rotation and the size and scope of the flights), the order of introduction of feed components and the state of each component (e.g., temperature and morphology) at the feed, etc., should be sufficient to produce a well-mixed (uniform), preferably paste-like mixture of the electrode components as an extrudate. Also, the conditions should not cause excessive degradation of any electrode component such as the polymer. The degree of uniformity of the extrudate can be monitored, for example, visually, by scanning electron microscopy, or even indirectly, by considering electric or other properties of the mixture. The amount of degradation of components such as a polymer can be monitored, for example, by monitoring molecular weight of a polymer before and after processing in the extruder. This may be performed by various methods, include gel permeation chromatography.

According to the invention, the electrode components can be processed through the extruder using minimal amounts of solvent, e.g., essentially no solvent, most preferably using no solvent. To accomplish this, the polymer salt complex (the ionic complex formed between the ionically-conductive polymer and the salt) should be processed through the extruder above its melt temperature, with other electrode components being distributed in the molten polymer salt complex. For this purpose, the term "molten" or "in the melt" means having a sufficiently low viscosity to permit uniform mixing of the feed components and allow the mixture to maintain a paste-like consistency. Preferably, a polymer such as the ionically-conductive polymer can be processed in the extruder in a melt state, e.g., molten. Any temperature that will cause polymer salt complex to exist in a molten state without causing substantial degradation or crosslinking of the polymer or other electrode components, can be useful. Specific examples of useful temperatures can depend on the polymer used. For DAP, preferred temperatures can be in the range from about 60 to about 120C, e.g., from about 80 to about 100C.

Each feed stream can be provided to the extruder in any useful form, in any useful order, with each preferably being provided as a continuous, consistent feed flow. Equipment useful for providing a feed flow into the extruder is well known and commercially available, with examples being loss in weight screw feeders, vibratory feeders, metering pumps, gear pumps, other extrusion devices, and volumetric feeders.

Any feed configuration that will result in a useful process and a useful extrudate can be used, as will be understood by a skilled artisan. A particular feed method for any given process can be selected to provide consistent continuous flow of the feed components through processing. Components can be fed in a starve fed fashion, meaning that the total mass flow is less than the maximum capacity of the extruder for mass flow at a given set of operating conditions (temperature, revolution rate, etc.). Further, the feed methods ideally maximize throughput, while minimizing polymeric degradation.

In preferred embodiments of the method, the electrolyte salt is fed first, and the polymer and other components are fed downstream from the salt. This configuration can be preferred because the electrolyte salt spontaneously chemically complexes at ambient conditions with the polymer (in preferred formulations) to form a viscous material which, if the polymer were fed upstream with the salt, would adhere to the feed throat walls and block the feed opening causing the process to fail. Therefore, the polymer is preferably fed downstream. The polymer can preferably be fed before or with (as opposed to after) the electrically conductive material and active material because those materials do not melt, or melt at temperatures much higher than the polymer. The polymer provides the matrix into which the electrically conductive material and the active material can be distributed, which facilitates flow in the extruder.

Also in some preferred methods, the lithium salt is preferably fed in a powder form. The electrically conductive material can be fed in the form of a powder, flake, or a fiber, but is preferably in the form of a powder. The active material is preferably fed in the form of a powder having an average particle size (diameter) in the range from about 0.5 to about 5 microns. The processing conditions should not cause the particle size of the active material to be reduced, since this may lead to inactivation of the active material.

According to one exemplary embodiment of the invention, the feed streams can take the form of multiple solventless, i.e., neat, electrode feed components. The arrangement of the feed streams into the extruder can vary, and can be chosen to be any useful configuration, but in one preferred embodiment the components of an electrode are fed to an extruder according to the following arrangement: an electrolyte salt, e.g., a lithium salt, is fed at the extruder's feed throat (the most upstream position in the extruder where a feed such as solid particulates can be fed into the extruder by gravity); polymer, including at least some or optionally entirely ionically-conductive polymer, is fed downstream; and a mixture of active material and electrically-conductive material is fed further downstream.

This embodiment of the process is illustrated in FIG. 1, which shows an extruder 2 having an electrolyte salt (not shown) being fed through feeder 1 at first feed 4 (shown as the feed throat of the extruder 2). Polymer is fed at second feed location 6 using feeder 30. A mixture of active material and electrically-conductive material is fed further downstream. Each of these respectively is first fed through feeder 31 (for the active material) and feeder 32 (for the electrically-conductive material), and the two are mixed together and fed as a mixture into a port 8 of side feeder side feeder 5 which then feeds the mixture into extruder 2 at location 12. Sidefeeder 5 is mounted directly on the side of the extruder at position 12. The sidefeeder 5 feeds the particulates in a positive displacement fashion directly into the inside of the extruder. Alternatively, the mixture could be fed by gravity. Motor 3 operates the extruder screws at a desired speed, causing the feed electrode components to be carried through the extruder 2 to the exit end 10, which optionally includes a die or some type of shaping mechanism. Additional equipment, shown generically as block 11, can be used to further shape or process the extrudate into a desired shape or form; such additional equipment can include one or more of, for example, calendar rolls, another extruder, or a die, etc.

In general, each electrode component can be introduced to the extruder in any form and by any technique that will provide a continuous, consistent flow of the component. Referring again to FIG. 1, the polymer may be provided in some circumstances, for example, through a non-reciprocating single screw extruder 30 that melts the polymer prior to the polymer being introduced to the multi-screw extruder 2. This is one preferred way of providing a consistent, smooth flow of the polymer to the extruder 2. The non-reciprocating extruder 30 would be operated at a temperature and rotation rate that provide a desired mass flow rate of polymer in a melted state to the extruder 2. Other continuous extruders could also be used. The flow rate of polymer fed to the extruder 2 can be chosen based on factors including the capacity of the extruder 2 and the relative amounts of the other electrode components. While it may be preferred in some situations to feed a melted polymer, it may also be useful in other embodiments of the method to feed a polymer in a solid state, e.g., as granular particulates which are a typical form of polymers.

FIG. 1 shows a mixture of active material and electrically-conductive material being fed at feed 8. The active material and electrically conductive material can be fed simultaneously after being preblended or can be fed by separate feeders 31 and 32 into the single feed location 8. One way to preblend is to use a jet mill. See, e.g., Example 1 of U.S. Pat. No. 6,136,476. Both materials are preferably fed as particulates ranging in size from 0.1–5.0 microns.

As is also shown in FIG. 1, an extrudate 10 of the processed electrode components is discharged from the end of the extruder 2, for further processing, e.g., with a die, calendar rolls, another extruder, or any other useful piece of equipment. The extrudate may be formed into a desired configuration, such as a film or coating deposited onto a substrate, and combined with other components of an electrochemical system, such as a battery, e.g., a lithium polymer battery.

Preferably, but not shown in FIG. 1, the extrudate is placed onto a substrate which allows further processing of the extrudate into an electrode. The substrate can be a liner, electrolyte, current collector, or other useful material, as will be appreciated by the skilled artisan. More specifically, a liner can be made of various known materials, including, for example, polypropylene, polyester, polyethylene, or polytetrafluoroethylene; a current collector may be made of, for example, copper, aluminum, or stainless steel; and a separator may be made up of, for example polyethylene or polypropylene.

Figure 2:
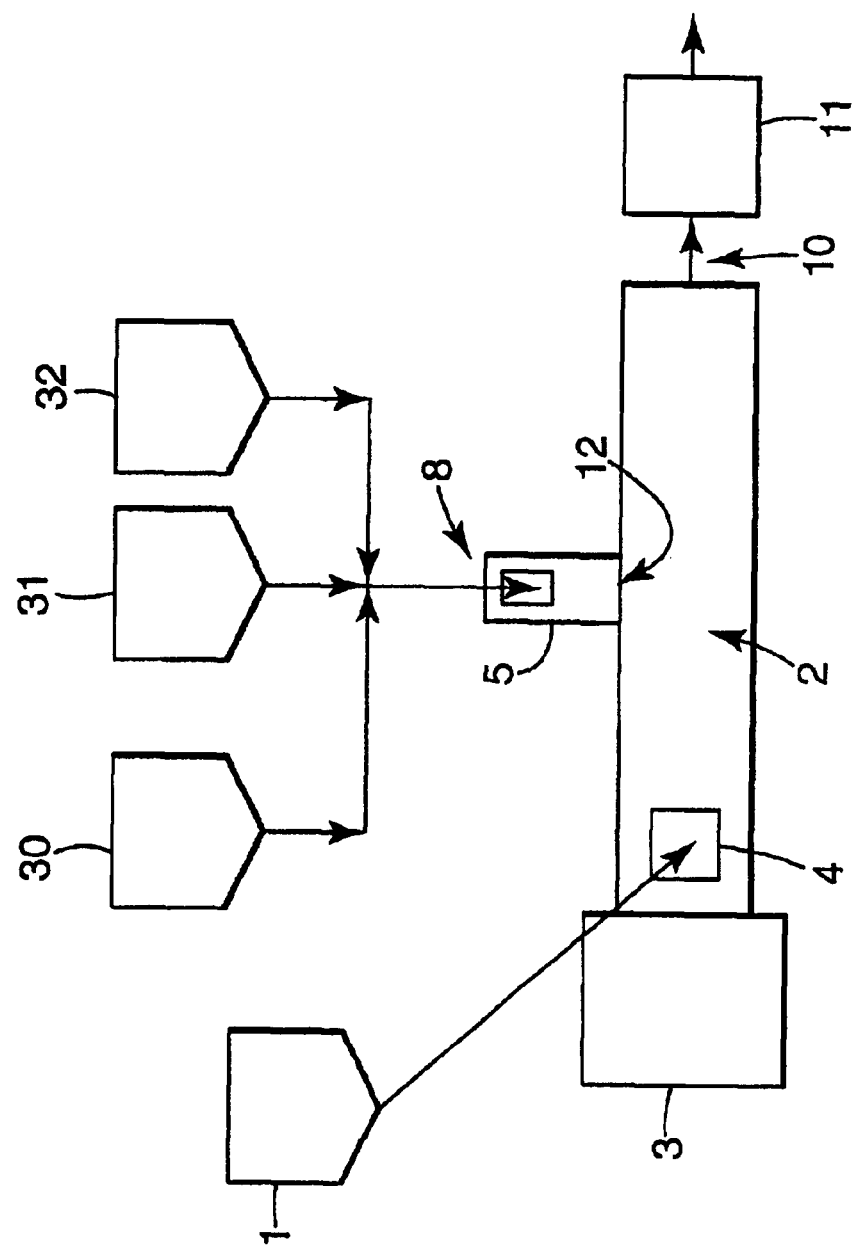

In other embodiments of the invention, the configuration of the feed components can be different. For instance, FIG. 2 illustrates a configuration wherein the electrolyte salt is still fed into the extruder 2 at the extruder's feed throat 4, and a single feed mixture containing polymer, active material, and electrically-conductive material, is fed into the extruder 2 somewhere downstream. FIG. 2 shows, more specifically, an embodiment where all three of a polymer, an active material, and an electrically-conductive material, are fed with separate feeders 30, 31, and 32, and combined into a mixture and fed into the extruder 2 to port 8 of sidefeeder 5 and then to extruder 2 at position 12.

Figure 3:
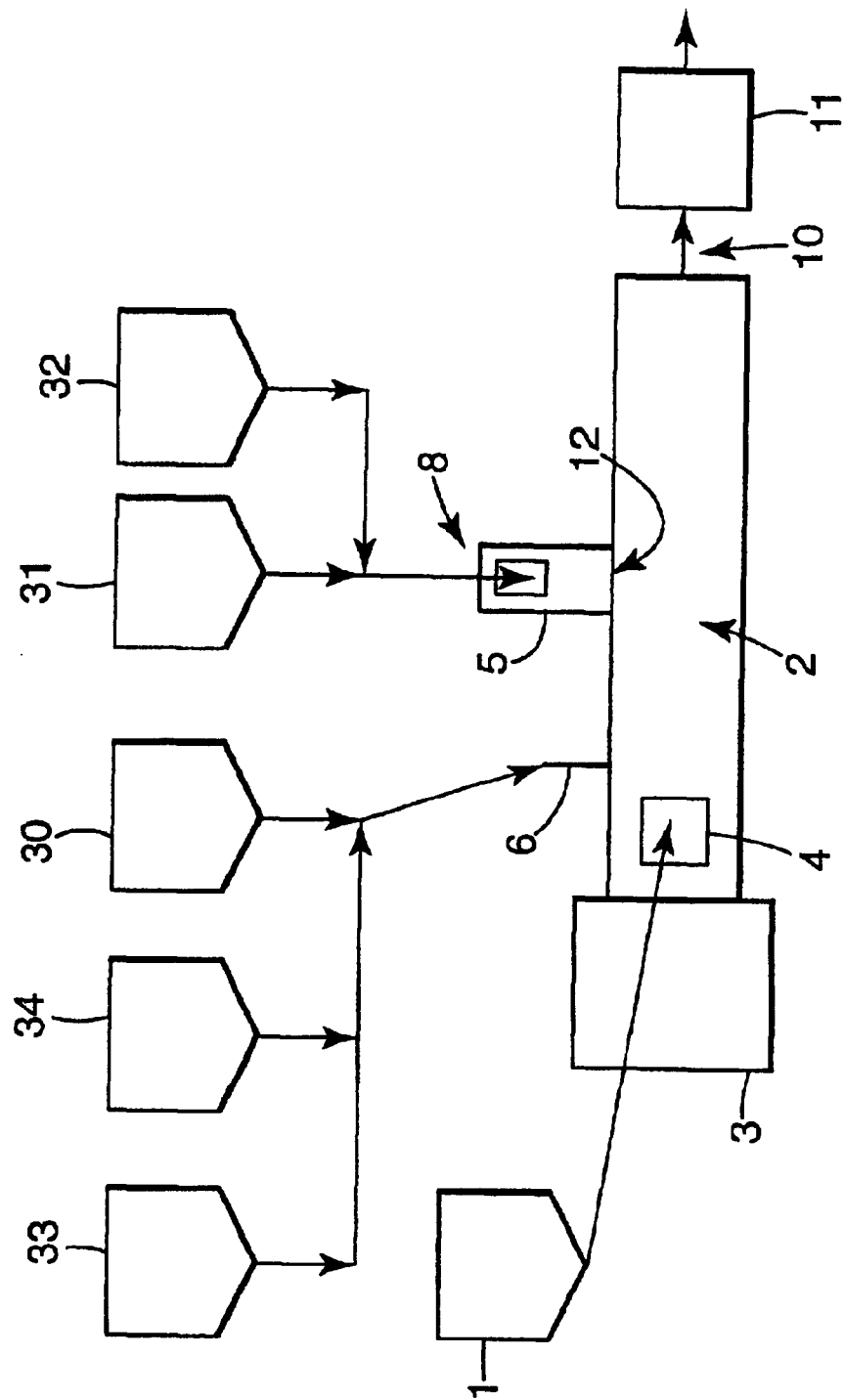

Still a different possible configuration is illustrated in FIG. 3. As is illustrated, the electrolyte salt is fed into the extruder 2 at the extruder's feed throat 4. A mixture containing only portions of the total amounts of active material and electrically-conducting material in the electrode, and the entire amount of ionically-conductive polymer, is fed into the extruder 2 at a downstream feed position 6. Specifically, each of feeders 30, 33, and 34, separately feed polymer, active material, and electrically-conductive material into a combined mixture that is fed into the extruder 2 at position 6 of extruder 2. Further downstream is fed a mixture of the remaining amounts of active material and electrically-conductive material. Specifically, active material and electrically-conductive material are each fed separately with feeders 31 and 32, and are combined into a mixture and fed to port 8 of sidefeeder 5 and then to extruder 2 at position 12.

A preferred electrochemical system relates to a battery that includes at least one cathode, at least one anode, a separator, and/or electrolyte.

The anode of, for example, a lithium battery, generally can consist of composite or film. The anode is generally applied to an expanded metal screen or metal foil (preferably aluminum, copper, or nickel) current collector using any one of a variety of processes such as coating, casting, pressing or extrusion. Specific examples of suitable battery anodes include lithium metal, lithium metal alloys, sodium metal, carbon-based materials such as graphite, coke, carbon fiber, pitch, transition metal oxides (such as $LiTi_5O_{12}$ and $LiWO_2$), and lithiated tin oxide. In the case of lithium ion batteries, the lithium may be intercalated into a host material such as carbon (i.e., to give lithiated carbon) or carbon alloyed with other elements (such as silicon, boron or nitrogen), a conductive polymer, or an inorganic host that is intercalatable (such as $Li_xTi_5O_{12}$). The material comprising the anode may be carried on foil (e.g., nickel and copper) backing or pressed into expanded metal screen and alloyed with various other metals. Also, in the case of a lithium metal foil, no current collector may be required.

Lithium batteries and supercapacitors may contain a separator to prevent short-circuiting between the cathode and anode. The separator of a battery usually consists of a single-ply or multi-ply sheet of microporous polymer (typically polyolefin, e.g., polyethylene, polypropylene, polytetrafluoroethyelene or combinations thereof) having a predetermined length and width and having a thickness of less than 10 mils (0.025 cm). For example, see U.S. Pat. No. 3,351,495 (Larsen et al.), U.S. Pat. No. 4,539,256 (Shipman et al.), U.S. Pat. No. 4,731,304 (Lundquist et al.) and U.S. Pat. No. 5,565,281 (Yu et al.). The pore size in these microporous membranes, typically about 5 microns in diameter, is sufficiently large to allow transport of ions but is sufficiently small to prevent cathode/anode contact, either directly or from particle penetration or dendrites which can form on the electrodes. In another battery embodiment the separator may comprise an ionically-conductive polymer and salt similar to that described for the electrode composition.

While the invention is described most specifically in terms of manufacturing certain cathodes, the invention is not limited to any specific embodiments identified in this description. For example, the invention can also be applied to the manufacture of anodes. An anode of a conventional lithium ion battery typically comprises a graphite composite with a binder such as polyvinylidenefluoride (PVDF). The graphite in this case is the active material that intercalates lithium. The anode could be manufactured according to the invention by alternately using an ionically-conductive polymer such as polyethylenoxide along with an electrolyte salt in the composite with the graphite.

The inventive method may also be employed to form electrochemical components for fuel cells. In this case, the process is performed in the same manner, except that no salt is added to the extruder in forming the electrochemical components being extruded.

In the case of fuel cells the "active" material is defined as the catalyst in either the anode or cathode. Fuel cells are of many types. In one type of fuel cell known as the "PEM" type (Proton Exchange Membrane) as described in U.S. Pat. No. 5,879,828 and incorporated herein by reference, the catalyst typically comprises platinum, the electrically conductive material comprises carbon and the ionically-conductive polymer comprises a sulfonated fluoropolymer such as NAFION (DuPont).

The invention is illustrated further by, but is not intended to be limited to, the following example.

EXAMPLE 1

Figure 4:
FIG. 4 is a photograph of a scanning electron microscope image of an exemplary electrode of the invention.

The process used a Berstorff® ZE 25 (Berstorff Corporation, Florence, Ky.) co-rotating, fully intermeshing twin-screw extruder (TSE) with internal loop water-cooling of all zones. The TSE has a 25 mm diameter screw and 32 L/D ratio (length/diameter). Overall throughput was 2.72 kg/hr. (6.0 lbs./hr.). The TSE barrel near the feed throat was cooled with recirculating chilled water. The TSE barrel from the feed throat to an L/D location of 32 was heated to a temperature setpoint of 176F. The TSE operated at 150 rpm. A twin-screw sidefeeder was attached to the side of the TSE at the L/D location of 23. 0.16 kg/hr of lithium bis (trifluoromethanesulfonyl)imide (3M, St. Paul, Minn.) was fed into the TSE feed throat hopper from a Ktron T20 loss-in-weight (LIW) feeder (K-Tron America, Pitman, N.J.). A "polymer powder" consisting of 4.555 kg of ethylene oxide/propylene oxide/allyl glycidyl ether copolymer (DAP, available from Daichi-Cogyo Seiyaku, Japan), 0.0273 kg of Santanox R antioxidant (Flexsys America L. P., Akron, Ohio) and 4.860 kg of "cathode powder" (prepared according to example 1 of U.S. Pat. No. 6,136,476 except that in this example the "cathode powder" consisted of 95% by weight oxide and 5% by weight carbon) were premixed in a Marion paddle mixer (Marion Mixers Inc., Marion, Iowa) for 10 minutes. The particle size for the cathode powder was about 1 micron. 0.99 kg/hr of this "polymer powder" was flood fed into a 1.25" diameter single screw extruder (Davis-Standard Killion, Pawcatuck, Conn.) which melted the polymer and provided pressure to directly inject the molten polymer into the TSE at an L/D location of 3.6. 1.57 kg/hr of the premixed "cathode powder" described above was fed from another Ktron feeder into the TSE's sidefeeder, which conveyed the powder into the TSE at a L/D location of 23 where it was then compounded with the polymer and lithium salt. Samples were collected in an aluminum pan and then sealed in a polyethylene bag prior to testing. This example represents a loading of 64.5% by weight of the active oxide material. A sample of the extruded material was placed between two sheets of low release coated PET and calendared to a thin film by multiple passes through a two roll mill. The final thickness of the cathode film was 30–90 microns. The thin film extruded material sample was examined using a Field Emission Microscope (FEM), which indicated excellent distributive mixing (See FIG. 4, at a 100× magnification of the film's surface).

What is claimed is:

1. A method for combining electrode components comprising:
   an active material,
   an electrically-conductive material,
   an ionically-conductive polymer,
   an electrolyte salt,
   and no added solvent,
   the method comprising processing the electrode components using a multi-screw extruder.

2. The method of claim 1 wherein each electrode component contains essentially no solvent.

3. The method of claim 1 wherein each electrode component is a dry material that contains no solvent.

4. The method of claim 1 wherein the combined electrode components include essentially no solvent.

5. The method of claim 1 wherein the combined electrode components include a total of less than 0.5 percent by weight solvent.

6. The method of claim 1 wherein the active material comprises a metal oxide.

7. The method of claim 1 wherein the particle size of the active material is not reduced during processing.

8. The method of claim 1 wherein the active material comprises a metal oxide selected from the group consisting of oxides of vanadium, manganese, cobalt, nickel, chromium, aluminum, tungsten, molybdenum, titanium, their lithiated versions, and mixtures thereof.

9. The method of claim 1 where the active material comprises a vanadium oxide.

10. The method of claim 1 wherein the electrode components comprise from about 50–86 weight percent active material.

11. The method of claim 1 wherein the electrode components comprise from about 60–68 weight percent active material.

12. The method of claim 1 wherein the electrically-conductive material comprises carbon black, graphite, or a combination thereof.

13. The method of claim 1 wherein the ionically-conductive polymer comprises a derivative of monomers comprising an oxygen-containing monomer or a nitrogen-containing monomer.

14. The method of claim 1 wherein the ionically-conductive polymer comprises a polyalkylene oxide polymer or copolymer.

15. The method of claim 1 wherein the electrolyte salt comprises a fluorinated lithium salt.

16. The method of claim 1 wherein the electrolyte salt is chosen from the group consisting of lithium hexafluoroarsenate, lithium perchlorate, lithium hexafluorophosphate, lithium trifluoroborate, lithium trifluoromethanesulfonate, lithium bis(trifluoromethanesulfonyl)imide, lithium bis(perfluoroethanesulfonyl)imide, lithium tris(trifluoromethanesulfonyl)methide, and mixtures thereof.

17. The method of claim 1 wherein the electrode components comprise:
   greater than about 50 weight percent active material,
   from about 1 to about 10 weight percent electrically-conductive material comprising carbon black, graphite, or a combination thereof,
   from about 10 to about 40 weight percent ionically-conductive polymer,
   from about 3 to about 15 weight percent lithium salt,
   and less than about 0.5 weight percent solvent.

18. The method of claim 17 wherein the active material comprises a metal oxide selected from the group consisting of oxides of vanadium, manganese, cobalt, nickel, chromium, aluminum, tungsten, molybdenum, titanium, their lithiated versions and mixtures thereof.

19. The method of claim 17 where the ionically-conductive polymer comprises a derivative of monomers comprising an oxygen-containing monomer or a nitrogen-containing monomer.

20. The method of claim 17 wherein the ionically-conductive polymer comprises a polyalkylenoxide polymer or copolymer.

21. The method of claim 17 wherein the lithium salt is chosen from the group consisting of lithium hexafluoroarsenate, lithium perchlorate, lithium hexafluorophosphate, lithium trifluoroborate, lithium trifluoromethanesulfonate, lithium bis(trifluoromethanesulfonyl)imide, lithium bis(perfluoroethanesulfonyl)imide, lithium tris(trifluoromethanesulfonyl)methide, and mixtures thereof.

22. The method of claim 1 wherein the extruder comprises multiple feed inlets and a downstream extruding end, and wherein
   the ionic salt feeds into the extruder at a first feed position,
   the ionically-conductive polymer, the active material, and the electrically-conductive material each feed into the extruder at one or more feed positions downstream from the ionic salt feed position.

23. The method of claim 22 wherein the ionically-conductive polymer feeds into the extruder as a solid containing no solvent.

24. The method of claim 22 wherein the ionically-conductive polymer feeds into the extruder as a melt.

25. The method of claim 22 wherein the ionically-conductive polymer feeds into the extruder at a second position downstream from the first feed position, and a mixture comprising active material and electrically-conductive material is fed at a third feed position downstream from the second feed position.

26. The method of claim 22 wherein ionically-conductive polymer, active material, and electrically-conductive material are combined and fed into the extruder as a single mixture at a second feed position.

27. The method of claim 22 wherein a mixture comprising active material, electrically-conductive material, and ionically-conductive polymer is fed at a second feed position, and a mixture comprising active material and electrically-conductive material is fed at a third feed position downstream from the second feed position.

28. An electrode prepared according to the method of claim 1.

29. A cathode prepared according to the method of claim 1.

30. A battery comprising an electrode prepared according to claim 1.

31. A motor vehicle comprising a battery of claim 30.

32. A computer comprising a battery of claim 30.

33. A power tool comprising a battery of claim 30.

34. A telecommunication device comprising a battery cell of claim 30.

35. The method of claim 1 wherein the extruder is a twin screw extruder.

36. The method of claim 35 wherein the twin screw extruder is a co-rotating twin screw extruder.

37. The method of claim 35 wherein the twin screw extruder is a fully intermeshing co-rotating twin screw extruder.

38. A method for combining electrode components comprising:
   an active material,
   an electrically-conductive material,
   an ionically-conductive polymer,
   an electrolyte salt,
   wherein the method comprises processing the electrode components using a twin screw extruder and
   wherein an ionically-conductive polymer salt complex material is processed in a molten state.

39. The method of claim 38 wherein the twin screw extruder is a co-rotating, fully intermeshing twin screw extruder.

40. A method of producing a battery cathode, the method comprising processing a mixture of ingredients comprising
   greater than about 50 weight percent active material,
   from about 1 to about 10 weight percent electrically-conductive material comprising carbon black, graphite, or a combination thereof,
   from about 10 to about 40 weight percent polymer comprising ionically-conductive polyalkylenoxide polymer,
   from about 3 to about 15 weight percent fluorinated lithium salt, wherein the mixture includes a total of less than about 0.5 percent by weight solvent, the method comprising using a twin screw extruder and processing an ionically-conductive polymer salt complex in a molten state.

41. The method of claim 40 wherein the twin screw extruder is a co-rotating, fully intermeshing twin screw extruder.

42. The method of claim 40 further comprising depositing an extrudate of the electrode components onto a substrate.

43. The method of claim 42 wherein the substrate is chosen from the group consisting of a liner, a current collector, a separator, or an electrolyte.

44. The method of claim 40 wherein the ingredients include at least about 50 weight percent active ingredient.

45. The method of claim 40 wherein the ingredients include at least about 60 weight percent lithiated vanadium oxide.

46. A cathode prepared according to the method of claim 40.

47. A method for combining electrode components comprising:

an active material, an electrically-conductive material, an ionically-conductive polymer, and no added solvent, the method comprising processing the electrode components using a co-rotating fully intermeshing twin screw extruder.

48. The method of claim 47 wherein the active material comprises platinum, the electrically conductive material comprises carbon, and the ionically-conductive polymer comprises a sulfonated fluoropolymer.

* * * * *

UNITED STATES PATENT AND TRADEMARK OFFICE
CERTIFICATE OF CORRECTION

PATENT NO.    : 6,939,383 B2
DATED         : September 6, 2005
INVENTOR(S)   : Eastin, Brian C.

It is certified that error appears in the above-identified patent and that said Letters Patent is hereby corrected as shown below:

Column 2,
Line 28, delete "dimetllyformamide" and insert -- dimethylformamide --.

Column 12,
Line 33, delete "100x" and insert -- 1000x --.

Signed and Sealed this

Seventeenth Day of January, 2006

JON W. DUDAS
*Director of the United States Patent and Trademark Office*